United States Patent [19]
Webby

[11] 4,386,307
[45] May 31, 1983

[54] SYNCHRONOUS MOTOR STARTER

[76] Inventor: Charles W. Webby, 218 Crawford Rd., Gisborne, New Zealand

[21] Appl. No.: 219,169

[22] Filed: Dec. 22, 1980

[51] Int. Cl.³ .................................. H02K 19/36
[52] U.S. Cl. .................... 318/705; 318/700; 318/711; 310/74; 310/163
[58] Field of Search ............. 318/700, 701, 702, 703, 318/704, 705, 136, 429, 491, 538, 161; 310/163, 74, 71, 574, 572, 573 R; 368/59

[56] References Cited

U.S. PATENT DOCUMENTS

| | | | |
|---|---|---|---|
| 1,838,501 | 12/1931 | Schiff | 310/163 |
| 2,001,914 | 5/1935 | Lenehon | 310/74 |
| 2,003,116 | 5/1932 | Hammond | 310/74 |

Primary Examiner—Joseph V. Truhe
Assistant Examiner—A. Evans
Attorney, Agent, or Firm—Ladas & Parry

[57] ABSTRACT

This invention relates to synchronous motor starters and provides a starter including a flywheel connected to the rotor shaft of a synchronous motor by yieldable connection means. When the synchronous motor reaches operating speed as an induction motor the yieldable connection means is in a stressed state and acts to subsequently accelerate the flywheel relative to the rotor shaft of the motor and further to decelerate the flywheel relative to the rotor shaft so that the motor reaches synchronism.

9 Claims, 10 Drawing Figures

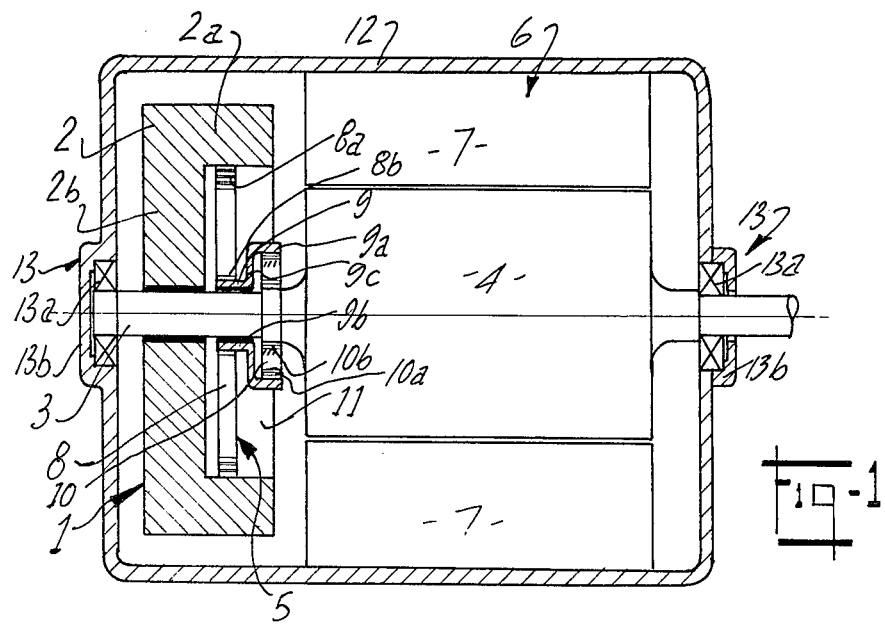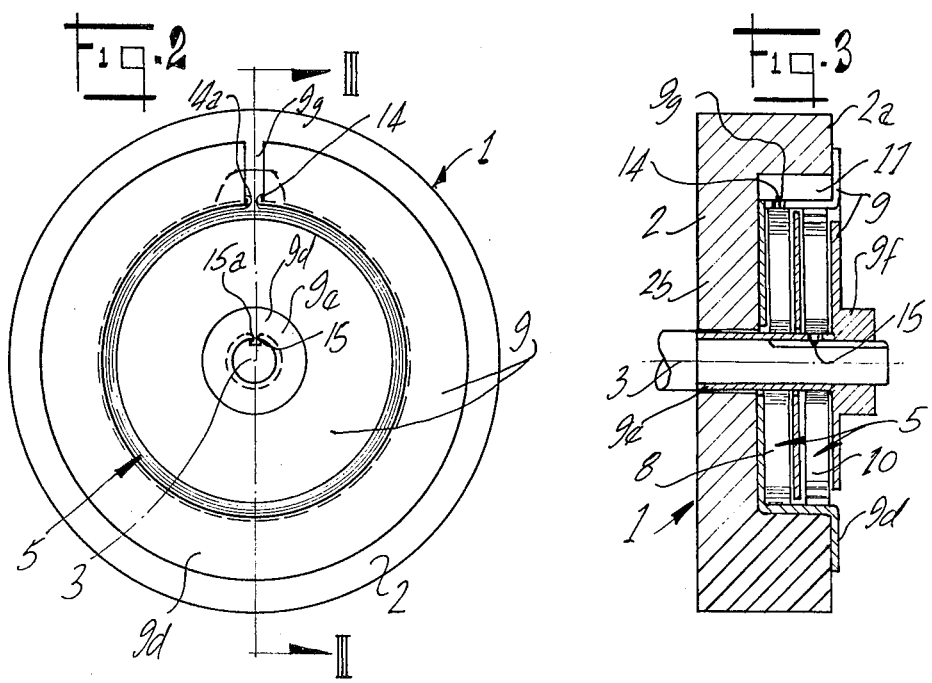

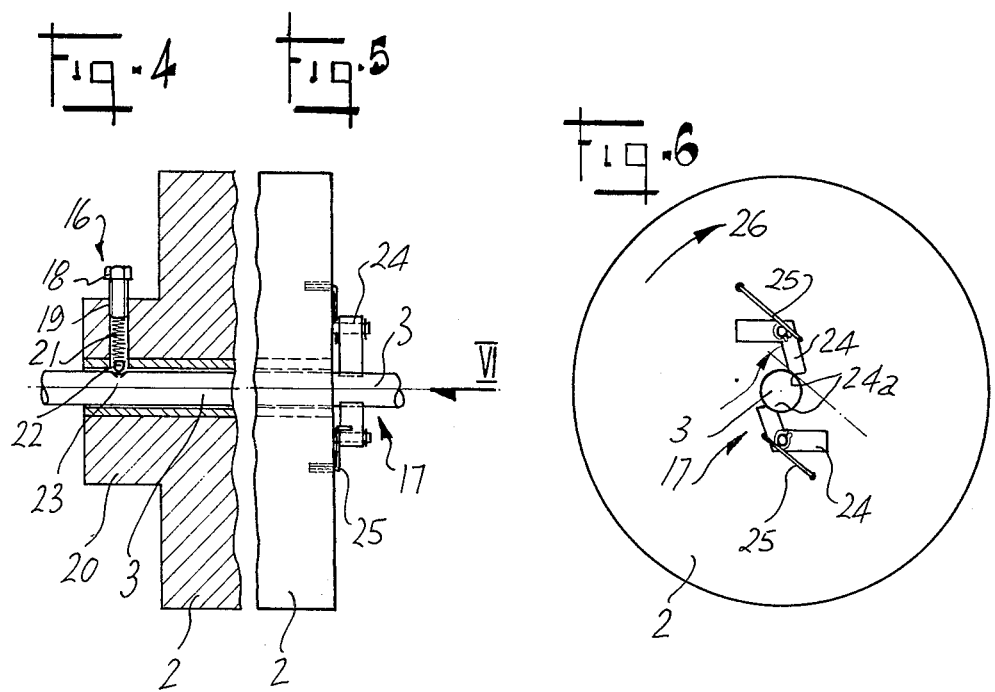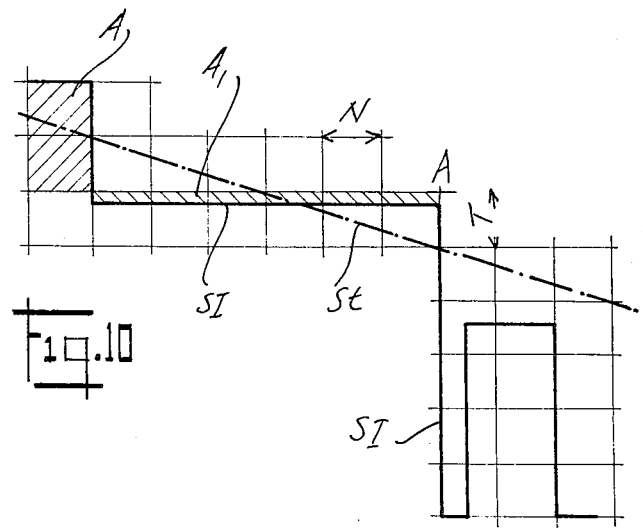

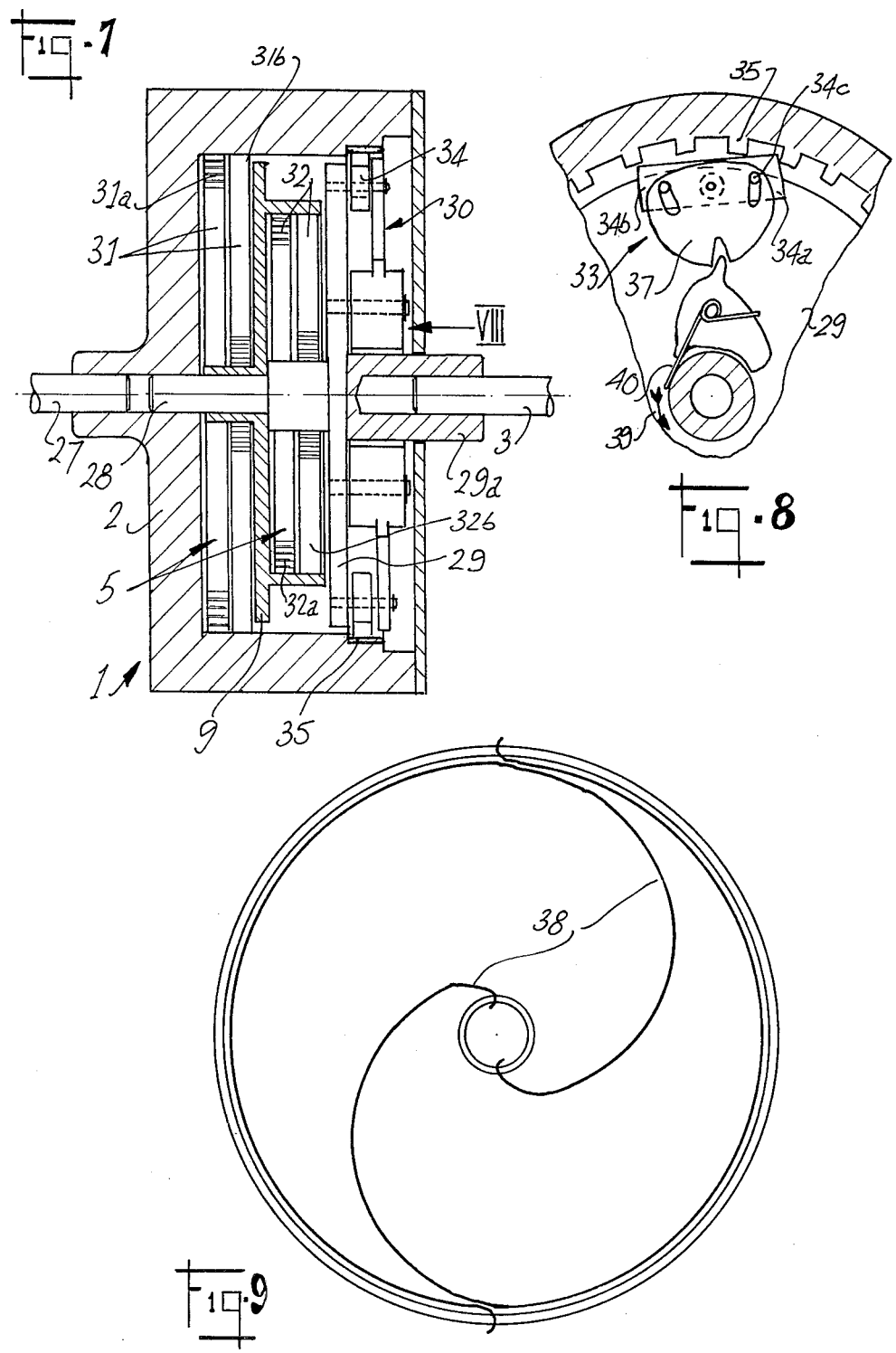

SYNCHRONOUS MOTOR STARTER

This invention relates to synchronous motors and has particular relevance to starting mechanisms for synchronous motors larger than the fractional horsepower motors.

Synchronous motors have two main advantages over induction motors, firstly they can be used for power factor control, and secondly once started the running speed of the motor is independent of the load on the motor. There are however some disadvantages with synchronous motors, namely that they are more expensive than pure induction motors, a direct current supply is necessary to excite the motor rotor, and at starting because the motor initially starts as an induction motor until it synchronises, arrangements need to be made for synchronising the motor.

It is an object of the present invention to provide a synchronous motor starter which will enable a synchronous motor to be synchronised while under load.

It is a further object of the present invention to provide a synchronising mechanism for a synchronous motor which is capable of bringing the motor to synchronous speed after starting.

Further objects and advantages of the present invention will become apparent from the ensuing description which is given by way of example only.

According to a first aspect of the present invention there is provided a synchronous motor starter comprising a synchronising mechanism including a flywheel mounted co-axially with and rotatable independantly with respect to the rotor shaft of a synchronous motor, and yieldable connection means connecting the flywheel to the rotor shaft the arrangement being such that when the motor reaches its operating speed as an induction motor said yieldable connection means is in a stressed state and acts to subsequently accelerate the flywheel relative to the rotor shaft and then decelerate the flywheel relative to the rotor shaft so that the motor reaches synchronism.

According to a further aspect of the present invention, there is provided a synchronous motor starter as aforesaid wherein the synchronising mechanism is mounted directly on the rotor shaft of the synchronous motor.

According to a still further aspect of the present invention, there is provided a synchronous motor as aforesaid, wherein the synchronising mechanism is independent of the motor and arranged to be interposed between the rotor shaft and a load connected to the rotor shaft of the synchronous motor.

Aspects of the present invention will now be described by way of example only with reference to the accompanying drawings in which;

FIG. 1: is a cross-sectional drawing of a synchronous motor starter in accordance with one possible embodiment of the present invention, and FIG. 2: is an end view of an alternative synchronising mechanism for the synchronous motor starter of FIG. 1, and FIG. 3: is a cross section at III:III of FIG. 2, and FIGS. 4 and 5: are sectional and side views respectively of locking and dampening means for the synchronous motor starter, and FIG. 6: is an end view in the direction of arrow VI of the dampening means of FIG. 5, and FIG. 7: is a cross-sectional drawing of a synchronous motor starter in accordance with a further embodiment of the present invention, and FIG. 8: is a diagrammatic end view in the direction of arrow VII of a ratchet locking means for a synchronous motor starter of FIG. 7, and FIG. 9: is a diagrammatic end view of possible arrangement of the torsion springs for the synchronising mechanism for a synchronous motor starter in accordance with the present invention, and FIG. 10: is a graphical illustration showing ideal characteristics in torsion springs for a synchronising mechanism of a synchronous motor starter in accordance with the present invention.

With reference firstly to FIGS. 1 and 7 of the drawings illustrating alternative forms, a synchronous motor starter in accordance with the present invention can comprise a synchronising mechanism generally indicated by arrow 1 including a flywheel 2 mounted co-axially with and rotatable independently with respect to the shaft 3 of a rotor 4 for a synchronous motor and yieldable connection means generally indicated by arrow 5 connecting the flywheel 2 to the rotor shaft 3, the arrangement being such that when the synchronous motor (shown in FIG. 1 only generally indicated by arrow 6, and comprising the rotor 4 its shaft 3 and a stator 7) reaches its operating speed as an induction motor the yieldable connection means 5 is in a stressed state and acts to subsequently accelerate the flywheel 2 relative to rotor shaft 3 so that the synchronous motor 6 reaches synchronism. As stress is reduced in the yieldable connection means 5, the rotor 4 remains at substantially constant speed determined by its induction motor characteristics then due to the relative motion of the flywheel 2 and the rotor shaft 3 the yieldable connection means 5 is stressed to accelerate the rotor shaft 3 to synchronism.

In accordance with the present invention two forms of synchronous motor starter as aforesaid are provided and in a first embodiment illustrated by FIG. 1, the synchronising mechanism is mounted directly on the rotor shaft 3 of the synchronous motor, and in a second embodiment illustrated by FIG. 7 of the drawings, the synchronising mechanism 1 is independant of and arranged to be interposed between the rotor shaft 3 of a synchronous motor (not shown in FIG. 7) and a load (not shown) co-axial with the rotor shaft 3.

For the synchronous motor starter illustrated by FIG. 1 of the drawings, the flywheel 2 is mounted concentrically with the rotor shaft 3 of the synchronous motor 6, but has no fixed contact with the rotor shaft and yieldable connection means 5 comprising a primary torsion spring 8 having its outer periphery 8a connected directly to the flywheel 2 and its inner periphery 8b connected to a ring connector 9 (which also has no fixed contact with the rotor shaft 3) and a secondary torsion spring 10 having its outer periphery 10a connected to the ring connector 9 and its periphery 10b connected to the rotor shaft 3 of the synchronous motor 6, the arrangement being such that the yieldable connection means 5 and the ring connector 9 are accommodated within a cavity 11 in the flywheel defined by an outer flange 2a thereof and an adjacent inner flange and hub 2b.

The primary torsion spring 8 can be a ribbon of spring steel which can be wound or unwound during operation of the motor and the secondary torsion spring may also be of this type and characteristic, however this is not essential. The primary torsion spring 8 is relatively soft and the starting torque of the motor is shared with the flywheel until the primary torsion spring 8 is fully wound. The wind-up spring illustrated will not reverse and accordingly when the primary torsion spring is unwound with flywheel speed near to the speed of the rotor energy from the secondary torsion spring 10 which is a hard bounce spring will rapidly accelerate the rotor until synchronism is reached and accordingly the load does not absorb excess energy.

For the FIG. 1 embodiment of the present invention, the ring connector 9 comprises a pair of adjacent mounting members 9a and 9b connected by a common flange or spokes 9c, the first mounting member 9a being arranged to mount the inner periphery 8b of the torsion spring 8, and a second mounting member being arranged to accommodate the outer periphery 10a of the torsion spring 10.

A synchronous motor starter in accordance with the embodiment illustrated by FIG. 1 of the drawings may include a housing 12 common to the synchronous motor rotor 6 which provides mounting means generally indicated by arrow 13 for the rotor 4 of the synchronous motor, and its shaft 3 which can include bearings 13a housed within caps 13b of the mounting means 13.

FIGS. 2 and 3 of the drawings illustrate an alternative form of yieldable connection means for the synchronous motor starter of FIG. 1 where there is provided a first disc mounting member 9d arranged to be mounted within the flywheel cavity 11 and fixed to the flywheel, and a second disc mounting member 9e including a boss 9f fixed to the rotor shaft 3 of the synchronous motor 6. The disc mounting member may include an aperture 9g such that a hooked end 14 of the outer periphery of the primary torsion spring 8 can engage therewith and likewise a hooked end 15 at the inner periphery of the secondary torsion spring 10 is mounted with respect to an aperture in the mounting member 9d. The other hooked end 14a of the secondary torsion spring 10 may also engage with aperture 9g and the hooked end 15a of the primary torsion spring 8 can also engage with the aperture in the mounting member 9d. The primary and secondary torsion springs 8 and 10 respectively are of spring steel and wound as a ribbon in opposing directions and by varying the thickness or width thereof spring characteristics can be varied in accordance with the ensuing discussion herein in relation to FIG. 10.

In operation and upon starting of the synchronous motor 6 as an induction motor the yieldable connection means 5 from a neutral unstressed condition will begin to become stressed taking energy from the rotor 3. When the motor 6 reaches its operating speed as an induction motor the connection means will be stressed and then act to accelerate the flywheel 2 relative to the rotor shaft 3 until the synchronous motor 6 reaches synchronism. In a typical synchronous motor starting as an induction motor the rotor 4 will run almost at constant speed after rapid acceleration, the acceleration also stressing the yieldable connection means 5 connected to the flywheel 2. As the flywheel then accelerates at a faster rate than the rotor 4 and stress is relieved from the yieldable connection means energy is returned to the rotor 4 for a short time. The characteristics of the primary and secondary torsion springs 8 and 10 respectively are predetermined such that the acceleration of the motor rotor 4 is sufficient for the synchronous motor to reach synchronism. The characteristics of the primary and secondary torsion springs are discussed further in this description in relation to FIG. 10 of the drawings. As aforesaid the flywheel 2 and ring connector 9 are free for relative rotation with respect to the rotor shaft 3 of the synchronous motor.

With reference to FIGS. 4, 5 and 6 of the drawings, a synchronous motor starter in accordance with the present invention may include adjustable locking and/or dampening means generally indicated by arrows 16 and 17 respectively which are provided to eliminate the effect of the flywheel on rotor speed, and to reduce the velocity of the flywheel in relation to the rotor shaft. By way of example the adjustable locking means 16 associated with the flywheel 2 and the rotor shaft may comprise a threaded member 18 adjustable in a threaded aperture 19 in a hub 20 for a flywheel 2, the threaded member 18 being adjustable to increase or decrease the compression of a spring 21 within the aperture 19 which is associated with a ball bearing 22 locatable in an indent 23 in the rotor shaft 3 of the synchronous motor. The indent 23 may be tapered in one direction for easier unlocking on starting. The flywheel 2 free to move on the rotor shaft 3 can additionally be provided with an inner bearing sleeve 24. When the spring 21 is compressed ball bearing 22 engages with the indent 23 the flywheel can be locked on the rotor shaft 3. The ball bearing 22 acts as a friction dampener and holds the flywheel from floating or oscillating at synchronism.

With reference to FIGS. 5 and 6 of the drawings, dampening means 17 may comprise a pair of oppositely disposed bushings 24 having their contact edges 24 in contact with the rotor shaft surface (which may be suitably treated with a high friction material).

The bushings 24 are held in their position on the shaft by springs 25 such that when the flywheel is rotated in the direction of arrow 26 relative to rotor shaft 3, the bias of the springs 25 will ensure effective contact in opposition to the rotor shaft rotation, and less dampening in the opposite direction.

An alternative form of synchronous motor starter in accordance with the present invention is illustrated by FIG. 7 of the drawings, the synchronising mechanism generally indicated by arrow 1 is independent of and arranged to be interposed between a rotor shaft 3 of a synchronous motor (not shown in FIG. 7) and a load (not shown) connected to shaft 27. In accordance with this embodiment the flywheel 2 fixed to shaft 27, is mounted concentrically with respect to the shafts 3 and 27 and is connected to the motor shaft by yieldable connection means 5 and a ring connector 9. The ring connector 9 is free to rotate on a coupling shaft 28 connected to a disc-like mounting plate 29 fixed to a shaft 3 which mounts a ratchet locking system generally indicated by arrow 30. When the rotor shaft 3 rotates energy is absorbed by the shaft 3 equivalent to the load on the motor and energy is absorbed by the primary torsion springs 31. The primary and secondary torsion springs 31 and 32 respectively are provided as pairs of wind-up spiral springs, and in each case a first spring 31a and 32a may be a stiff wind up spiral spring whilst the other springs 31b and 32b which oppose the action of the first springs may be softer limit stop springs. Thus, when the first springs 31a and 32a are unwound the springs 31b and 32b can be fully wound acting as limit stops to the first springs 31a and 32b. Springs 31 and 32 are wound in opposing direction and accordingly as one spring winds up there is a tendency for it to unwind the other, and the springs operate in one direction at a time and the characteristics of each spring will prevent overstressing. The primary torsion springs 31a and 31b are softer than the secondary torsion springs 32a and 32b.

The ratchet locking system 30 mounted on mounting plate 29 of the coupling shaft 28 shown both in FIGS. 7 and 8 may comprise a ratchet member generally indicated by arrow 33 comprising two independent pivotably mounted engaging members 34a and 34b arranged to engage with teeth 35 in the body of the flywheel 2 and include centrifugal actuation means 36 mounted adjacent the hub 29a of the mounting plate 29 which ensures that the engaging member 34 is retained in its position by applying a bias thereof through swivel plate 37. The ratchet locking device described or other equivalent devices are arranged to prevent unwanted motion of the flywheel 2 which could otherwise occur as a result of an imbalance of forces arising during operation of the synchronous motor, and in accordance with the embodiment illustrated the engaging members 34a and 34b act to hold the primary torsion spring 31 fully wound until the motor reaches operational speed as an induction motor rotating in the direction of arrow 39. At this point the centrifugal actuator 36 overcomes the spring 40 and dislodges swivel plate 37. Ratchet 34a then lifts clear of the teeth 35 and frees the ratchet 34b which will then engage with the teeth 35. Thus the primary torsion spring is permitted to unwind and the ratchet 34b acts to lock the secondary torsion spring fully wound, locking the flywheel and rotor as one. The ratchet is capable of resetting at low speeds to prepare for new starts. Pins 34c on the ratchets are arranged to engage in slots on the swivel plate and in an alternative arrangement (not shown) hair springs may be used to secure the engagement of the ratchet against the teeth 35.

FIG. 9 of the drawings is a diagrammatic illustration of a possible means for centrifugal balance of two spiral springs using a plurality of spring suctions 38 wound together.

With reference to FIG. 10 of the drawings, where the vertical divisions in the sketch represent Torque T available from a torsion spring and the horizontal divisions represent the number of turns N of the spring from an unstressed state at axis A, an ideal characteristic for a torsion spring for a synchronous motor starter is represented by curve S1. Initially the torsion spring should have a torque characteristic which is less than the torque required to accelerate the flywheel if it was fixed directly to the motor rotor (thus ensuring that the spring can be stressed). An overwind section of the spring represented at the extreme left of the diagram is arranged to compensate for speed differential between the rotor of the synchronous motor and the flywheel of the synchronous motor starter. Ideally area A should equal area A, and to achieve this varying spring thickness and flexibility can be predetermined to give the desired result. A hard bounce spring or section of the spring as represented to the right of the axis A may initially be provided with a hard section, an intermediate softer section and a further hard section as is illustrated by the diagram. The effect of a spring of section or separate spring of this characteristic is that the hard section will act to bring the rotor of the synchronous motor quickly up to its synchronous speed and the alternative softer section will provide a little time for the rotor to synchronise and for that reason the torque characteristic of the soft section may be equivalent to load torque. The dotted line ST represents a typical torque characteristic for a linear type spring. The ideal torque characteristic illustrated may also be obtainable with two 'sets' of flywheels (not shown) each having its own spring or springs and moment of inertia, such that the flywheels unwind simultaneously and reach the unstressed state at the same time. For example one flywheel would have a hard bounce spring to accelerate the rotor to synchronism whilst another flywheel would have a soft bounce spring arranged to hold the motor near its synchronous speed.

Where ratchet locking is used each flywheel would have its own ratchet locking system which may have a common activating mechanism, and the use of gears to effect turning ratios between the flywheel and the rotor shaft of a synchronous motor could be used to reduce the size of flywheel required.

In the aforegoing description springs are stressed by flywheel inertia, however it will be appreciated that the springs may be stressed by a brake (not shown) operating one the flywheel which may be electrically controlled and arranged to release the flywheel after the motor has started, or a mechanical pad type brake (not shown) operating on the flywheel to slow it down whilst the motor is running, or by variation of the load which could be done with respect of the FIG. 7 embodiment of the present invention.

Aspects of the present invention have been described by way of example only and it is to be appreciated that modifications and additions thereto may be provided without departing from the scope of the present invention as defined in the appended claims.

I claim:

1. A synchronous motor starter comprising a synchronising mechanism including a flywheel mounted co-axially with and rotatable independently with respect to the rotor shaft of a synchronous motor and yieldable connection means connecting the flywheel to the rotor shaft wherein the synchronising mechanism is mounted directly on the rotor shaft of the synchronous motor and said flywheel is mounted concentrically with the rotor shaft of the synchronous motor but has no fixed contact with the rotor shaft and the yieldable connection comprises a primary torsion spring or springs having its outer periphery connected to the flywheel and its inner periphery connected to a ring connector which has no fixed contact with the rotor shaft, and a secondary torsion spring or springs having its outer periphery connected to the ring connector and its inner periphery connected to the rotor shaft of the synchronous motor, said torsion spring or springs and their common ring connector being positioned within a flywheel cavity in the flywheel defined by an outer flange of the flywheel and an adjacent inner flange of the flywheel and the arrangement being such that when the motor reaches its operating speed as an induction motor said yieldable connection means is in a stressed state and acts to subsequently accelerate the flywheel relative to the rotor shaft, and then decelerate the flywheel relative to the rotor shaft so that the motor reaches synchronism.

2. A synchronous motor starter as claimed in claim 1 wherein the ring connector comprises a pair of adjacent mounting members connected by a common flange, spokes or the like, a first mounting member being arranged to mount the inner periphery of the primary torsion spring or springs and a second mounting member being arranged to accommodate the outer periphery of the second torsion spring.

3. A synchronous motor starter as claimed in claim 1 wherein the mounting members of the ring connector are separate, there being provided a first disc member arranged to be mounted within the flywheel cavity and fixed to the flywheel and a second disc member including a boss fixed to the rotor shaft of the synchronous motor.

4. A synchronous motor starter as claimed in claim 3 wherein a hooked end of the outer periphery of the primary torsion spring is arranged to engage with an aperture in the second mounting member of the gripping portion and likewise a hooked end at the inner periphery of the second torsion spring is mounted with respect to a lip or aperture in the first mounting member.

5. A synchronous motor starter as claimed in claim 1 including dampening means associated with the flywheel and the rotor shaft and optionally adjustable to reduce the velocity of the flywheel in relation to the rotor shaft.

6. A synchronous motor starter comprising a synchronising mechanism including a flywheel mounted co-axially with and rotatable independently with respect to the rotor shaft of a synchronous motor and yieldable connection means connecting the flywheel to the rotor shaft wherein the synchronising mechanism is independent of the motor and arranged to be interposed between the rotor shaft and a load connected to the rotor shaft of the synchronous motor and the yieldable connection means comprises two adjacent primary torsion springs connecting the flywheel to a ring connector and two adjacent secondary torsion springs connecting the ring connector to the rotor shaft, the arrangement being such that when the motor reaches its operating speed as an induction motor said yieldable connection means is in a stressed state and acts to subsequently accelerate the flywheel relative to the rotor shaft, and then decelerate the flywheel relative to the rotor shaft so that the motor reaches synchronism.

7. A synchronous motor starter as claimed in claim 6 wherein at least one of the primary torsion springs is a limit stop spring and at least one of the secondary torsion springs is a limit stop spring.

8. A synchronous motor starter as claimed in claim 6 including a locking ratchet system.

9. A synchronous motor starter as claimed in claim 6 wherein the ring connector and locking ratchet system are mounted with respect to a flywheel shaft and the flywheel includes means for coupling it between a load and the rotor shaft of a synchronous motor.

* * * * *